US008004825B2

(12) United States Patent
Kobayashi et al.

(10) Patent No.: US 8,004,825 B2
(45) Date of Patent: Aug. 23, 2011

(54) SOLID ELECTROLYTE CAPACITOR

(75) Inventors: Yasumi Kobayashi, Yawata (JP);
Takashi Umemoto, Hirakata (JP);
Hiroshi Nonoue, Hirakata (JP)

(73) Assignee: Sanyo Electric CO., Ltd.,
Moriguchi-shi (JP)

( * ) Notice: Subject to any disclaimer, the term of this patent is extended or adjusted under 35 U.S.C. 154(b) by 432 days.

(21) Appl. No.: 12/212,707

(22) Filed: Sep. 18, 2008

(65) Prior Publication Data

US 2009/0080143 A1    Mar. 26, 2009

(30) Foreign Application Priority Data

Sep. 21, 2007    (JP) ................................ 2007-244570
Aug. 4, 2008     (JP) ................................ 2008-201256

(51) Int. Cl.
*H01G 9/00* (2006.01)

(52) U.S. Cl. ........ 361/523; 361/516; 361/519; 361/525; 361/528; 361/529

(58) Field of Classification Search .......... 523/516–519, 523/523–525, 530–531, 540–541, 509–512, 523/502–504, 528–529
See application file for complete search history.

(56) References Cited

U.S. PATENT DOCUMENTS

| 6,906,912 | B2 * | 6/2005 | Arai et al. ...................... 361/525 |
| 6,917,514 | B2 * | 7/2005 | Mido et al. ..................... 361/533 |
| 7,042,709 | B2 * | 5/2006 | Kobayashi et al. ........... 361/523 |
| 7,242,073 | B2 * | 7/2007 | Mosley et al. ................. 257/532 |
| 2009/0128996 | A1 * | 5/2009 | Kobayashi et al. ........... 361/523 |

FOREIGN PATENT DOCUMENTS

| JP | 04-048710 A | 2/1992 |
| JP | 11-016787 A | 1/1999 |
| JP | 2003-272960 A | 9/2003 |

* cited by examiner

*Primary Examiner* — Nguyen T Ha
(74) *Attorney, Agent, or Firm* — Marvin A. Motsenbocker; Mots Law, PLLC

(57) ABSTRACT

A solid electrolyte capacitor that prevents the capacitance from decreasing. The solid electrolyte capacitor includes an anode, a cathode, and a dielectric layer, which is arranged between the anode and the cathode in contact with the cathode. The dielectric layer includes a plurality of recesses arranged at an interface between the dielectric layer and the cathode.

6 Claims, 8 Drawing Sheets

| Solid Electrolyte Capacitor | | Anode Oxidization Conditions | | | Average Pit Diameter | Capacitance Retention Rate |
|---|---|---|---|---|---|---|
| | | Temperature | Voltage Amplitude | Voltage Cycle | | |
| Ex.3 | A3 | 52℃ | 0.2V | 2min | 0.1nm | 82% |
| Ex.2 | A2 | 52℃ | 0.2V | 5min | 0.2nm | 90% |
| Ex.4 | A4 | 52℃ | 0.2V | 7min | 1.0nm | 91% |
| Ex.1 | A1 | 52℃ | 0.2V | 10min | 2.5nm | 98% |
| Ex.5 | A5 | 52℃ | 0.2V | 13min | 5.0nm | 94% |
| Ex.6 | A6 | 52℃ | 0.2V | 15min | 10.0nm | 96% |
| Ex.7 | A7 | 52℃ | 0.2V | 17min | 20.0nm | 97% |
| Ex.8 | A8 | 52℃ | 0.2V | 20min | 50.0nm | 91% |
| Ex.9 | A9 | 52℃ | 0.2V | 60min | 70.0nm | 81% |
| Comp. Ex. | X | 52℃ | - | - | - | 58% |

Fig.7

| | Solid Electrolyte Capacitor | Anode Oxidization Conditions | | | Average Pit Diameter (Ratio to Average Diameter) | Capacitance Retention Rate |
|---|---|---|---|---|---|---|
| | | Temperature | Voltage Amplitude | Voltage Cycle | | |
| Ex.11 | B2 | 40℃ | 0.2V | 10min | 2.5nm (1 x) | 81% |
| Ex.12 | B3 | 45℃ | 0.2V | 10min | 3.8nm (1.5x) | 94% |
| Ex.13 | B4 | 50℃ | 0.2V | 10min | 5.0nm (2 x) | 90% |
| Ex.14 | B5 | 55℃ | 0.2V | 10min | 12.5nm (5 x) | 95% |
| Ex.10 | B1 | 60℃ | 0.2V | 10min | 15.0nm (6 x) | 98% |
| Ex.15 | B6 | 63℃ | 0.2V | 10min | 17.5nm (7 x) | 96% |
| Ex.16 | B7 | 64℃ | 0.2V | 10min | 25.0nm (10 x) | 93% |
| Ex.17 | B8 | 65℃ | 0.2V | 10min | 37.5nm (15 x) | 92% |
| Ex.18 | B9 | 70℃ | 0.2V | 10min | 50.0nm (20 x) | 91% |
| Ex.19 | B10 | 80℃ | 0.2V | 10min | 75.0nm (30 x) | 82% |
| Comp. Ex. | X | 52℃ | - | - | - ( - ) | 58% |

Fig.8

| | Solid Electrolyte Capacitor | Anode Oxidization Conditions | | | Average Interval Between Adjacent Pits (Ratio to Average Diameter) | Area Rate of Pit Opening | Capacitance Retention Rate |
|---|---|---|---|---|---|---|---|
| | | Temperature | Voltage Amplitude | Voltage Cycle | | | |
| Ex.21 | C2 | 60℃ | 1.00V | 10min | 3.8nm (1.5x) | 1/ 6.2 | 82% |
| Ex.22 | C3 | 60℃ | 0.70V | 10min | 4.2nm (1.7x) | 1/ 7.3 | 87% |
| Ex.20 | C1 | 60℃ | 0.50V | 10min | 5.0nm (2 x) | 1/ 9 | 90% |
| Ex.10 | B1 | 60℃ | 0.20V | 10min | 7.5nm (3 x) | 1/ 16 | 98% |
| Ex.23 | C4 | 60℃ | 0.17V | 10min | 12.5nm (5 x) | 1/ 36 | 95% |
| Ex.24 | C5 | 60℃ | 0.15V | 10min | 25.0nm (10 x) | 1/ 120 | 95% |
| Ex.25 | C6 | 60℃ | 0.13V | 10min | 50.0nm (20 x) | 1/ 440 | 94% |
| Ex.26 | C7 | 60℃ | 0.10V | 10min | 125.5nm (50 x) | 1/ 2600 | 91% |
| Ex.27 | C8 | 60℃ | 0.05V | 10min | 175.0nm (70 x) | 1/ 5000 | 87% |
| Ex.28 | C9 | 60℃ | 0.03V | 10min | 250.0nm (100 x) | 1/10000 | 82% |
| Comp. Ex. | X | 52℃ | — | — | — ( — ) | — | 58% |

Fig.9

| Solid Electrolyte Capacitor | Average Pit Diameter | Area Rate of Pit Opening | Capacitance Retention Rate |
|---|---|---|---|
| Ex.29 | D1 | 0.2nm | 1/9 | 88% |
| Ex.30 | D2 | 0.2nm | 1/2600 | 89% |
| Ex.31 | D3 | 50.0nm | 1/9 | 90% |
| Ex.32 | D4 | 50.0nm | 1/2600 | 89% |
| Comp. Ex. | X | - | - | 58% |

SOLID ELECTROLYTE CAPACITOR

CROSS-REFERENCE TO RELATED APPLICATIONS

This application is based upon and claims the benefit of priority from the prior Japanese Patent Applications No. 2007-244570, filed on Sep. 21, 2007, and No. 2008-201256, filed on Aug. 4, 2008, the entire contents of which are incorporated herein by reference.

BACKGROUND OF THE INVENTION

The present invention relates to a solid electrolyte capacitor.

A typical solid electrolyte capacitor is manufactured by anodizing an anode, which is made of a valve metal such as niobium (Nb) and tantalum (Ta), to form a dielectric layer including mainly oxides on the surface of the anode. Then, an electrolyte layer is formed on the dielectric layer, and a cathode layer is formed on the electrolyte layer. Japanese Laid-Open Patent Publication No. 4-48710 describes an electrolyte layer formed by superimposing on a first conductive polymer layer of polypyrrole formed through chemical polymerization onto a second conductive polymer layer of polypyrrole formed through electrolytic polymerization.

In such a solid electrolyte capacitor, however, the dielectric layer and the electrolyte layer may separate at the interface therebetween. This may decrease the capacitance. In particular, when inspections are conducted under high temperatures or when thermal treatment is performed during a reflow soldering process, the layer separation at the interface becomes more eminent and the capacitance further decreases (deteriorates). Thus, it is strongly required that solid electrolyte capacitors be improved so that such layer separation does not occur.

SUMMARY OF THE INVENTION

The present invention provides a solid electrolyte capacitor that prevents the capacitance from decreasing.

One aspect of the present invention is a solid electrolyte capacitor including an anode, a cathode, and a dielectric layer arranged between the anode and the cathode in contact with the cathode. The dielectric layer includes a plurality of recesses arranged at an interface between the dielectric layer and the cathode.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

In the drawings, like numerals are used for like elements throughout.

Figure 1:
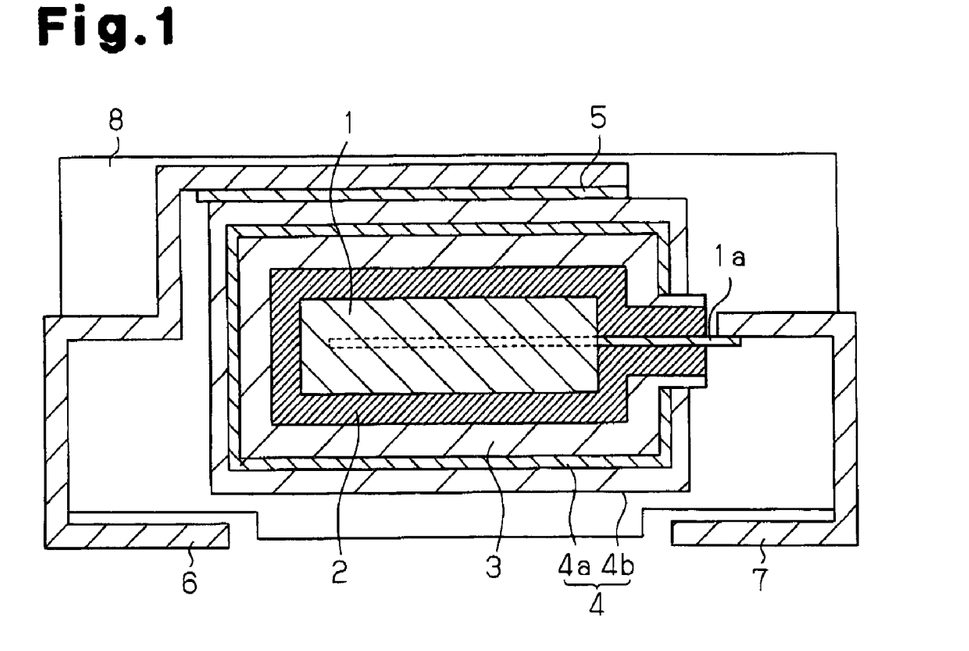
FIG. 1 is a schematic cross-sectional view showing a preferred embodiment of a solid electrolyte capacitor according to the present invention.
Figure 2A:
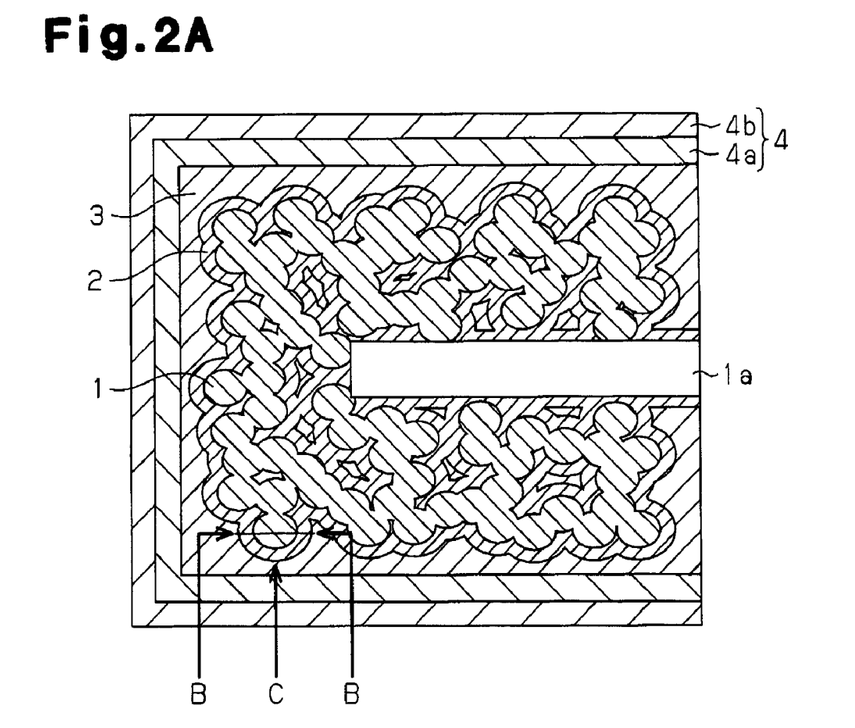
FIG. 2A is an enlarged, schematic cross-sectional view showing the vicinity of an anode body in the solid electrolyte capacitor of FIG. 1.
Figure 2B:
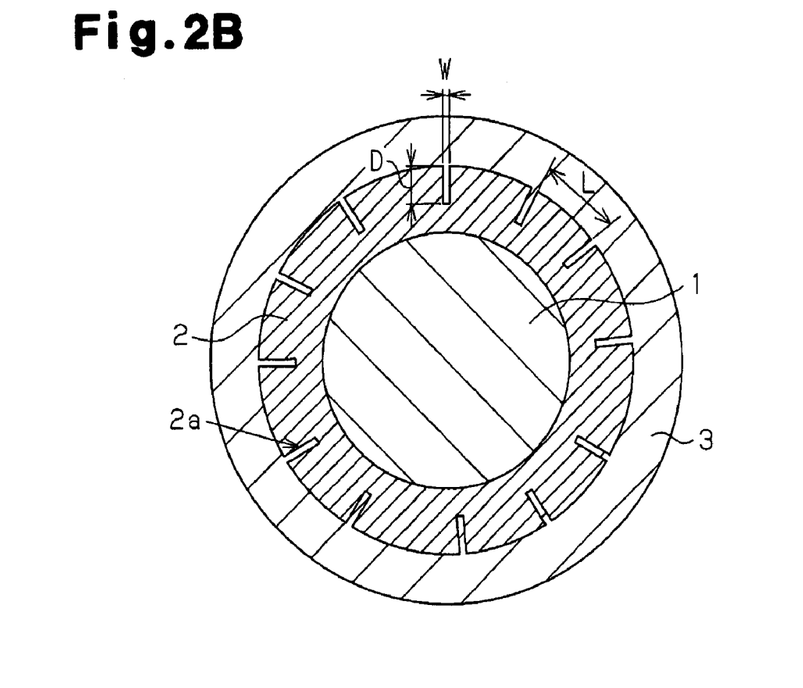
FIG. 2B is an enlarged cross-sectional showing a single metal particle of the anode body.
Figure 4:
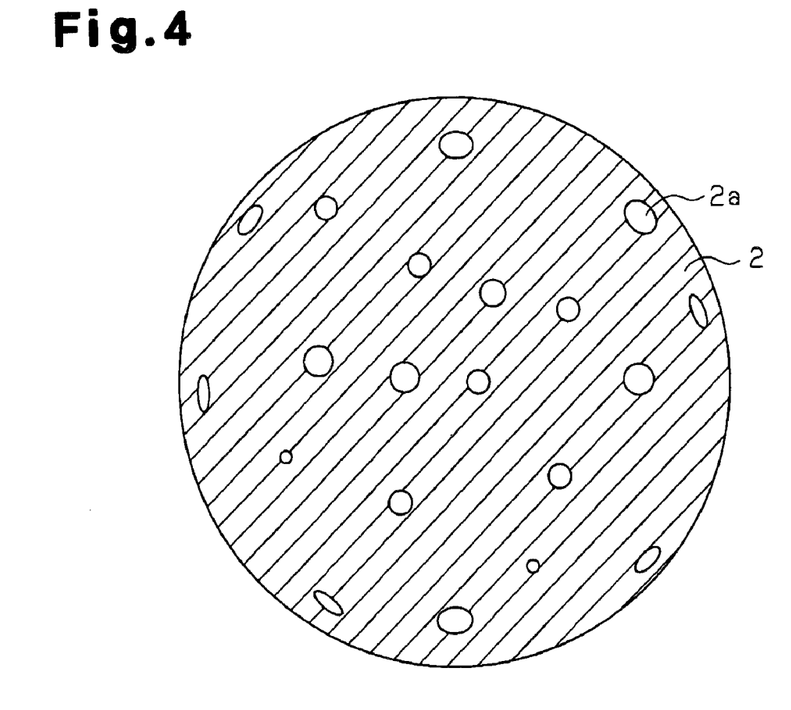
FIG. 4 is a schematic plan view showing the surface of a dielectric layer in the solid electrolyte capacitor.

A preferred embodiment of the present invention will be discussed with reference to the drawings. The present invention is not limited to this embodiment. FIG. 1 is a schematic cross-sectional view showing the structure of a solid electrolyte capacitor in the preferred embodiment. FIG. 2A is an enlarged, schematic cross-sectional view showing the vicinity of an anode body in the solid electrolyte capacitor of FIG. 1, and FIG. 2B is a cross-sectional view showing a single metal particle in the anode body. The cross-sectional view FIG. 2B is taken along line B-B of FIG. 2A. FIG. 4 is a schematic plan view showing the surface at the cathode side of a dielectric layer 2 as viewed in a direction indicated by arrow C in FIG. 2A.

As shown in FIG. 1, in the preferred embodiment, the solid electrolyte capacitor includes an anode body 1, a dielectric layer 2 formed on the anode body 1, a conductive polymer layer 3 formed on the dielectric layer 2, and a cathode layer 4 formed on the conductive polymer layer 3. As shown in FIG. 2B, the dielectric layer 2 includes pore-like pits 2a (recesses) extending in a thicknesswise direction of the dielectric layer 2 towards the anode body 1 (metal particle) from an interface between the dielectric layer 2 and the conductive polymer layer 3. More specifically, the pits 2a are formed in the surface of the dielectric layer 2, as shown in FIG. 4. Preferably, each pit 2a extends to a depth that does not reach the interface between the anode body 1 and the dielectric layer 2 to prevent short-circuiting between the cathode and the anode. That is, the pit 2a is formed so that it does not extend through the dielectric layer 2 in the thicknesswise direction. Each of the pits 2a is filled with the conductive polymer layer 3. However, the pits 2a do not all have to be filled with the conductive polymer layer 3. The pits 2a may be partially filled with the conductive polymer layer 3 or be completely hollow and free from the conductive polymer layer 3. Alternatively, some of the pits 2a may be completely or partially filled with the conductive polymer layer 3, while other pits 2a do not include the conductive polymer layer 3 at all.

The structure of the solid electrolyte capacitor will now be discussed in detail.

Referring to FIG. 2A, the anode body 1 is a porous sintered body formed from metal particles of a valve metal. An anode lead 1a, which is formed from a valve metal, is embedded in the anode body 1. The valve metal of the anode lead 1a and the anode body 1 enables the formation of an insulative oxide film, and may be niobium, tantalum, aluminum (Al), titanium (Ti), or the like. An alloy of these valve metals may also be used.

The dielectric layer 2 is a dielectric formed from an oxide of the valve metal and arranged with a predetermined thickness on the surface of the anode lead 1a and the anode body 1. If the valve metal includes niobium metal, the dielectric layer 2 is niobium oxide. Referring to FIGS. 2B and 4, the plurality of pits 2a (recesses) are dispersed in the surface of the dielectric layer 2 (cathode side surface of the dielectric layer 2). Each pit 2a extends in the thicknesswise direction of the dielectric layer 2 from the surface of the dielectric layer 2 towards the anode body (metal particle) 1. Further, as shown in FIG. 2B, each pit 2a has a predetermined opening diameter W and a predetermined depth D. Moreover, each pit 2a is spaced from the adjacent pit 2a by a predetermined interval L. The plurality of pits 2a are distributed so that the pit openings occupy the surface of the dielectric layer 2 with a predetermined area rate P (in a predetermined region of the dielectric layer 2, the total area Y of the pit openings relative to the area X of the predetermined region, i.e., Y/X). In the preferred embodiment, the dielectric layer 2 includes fluorine (F), which is concentrated at the anode side of the dielectric layer 2. Specifically, the concentration of fluorine varies along the thicknesswise direction of the dielectric layer 2 (direction from the cathode side to the anode side of the dielectric layer 2) and is maximum at the interface of the dielectric layer 2 and the anode body 1.

The conductive polymer layer 3 functions as an electrolyte layer and is arranged on the surface of the dielectric layer 2, which includes the interior of the pits 2a. The conductive polymer layer 3 is a laminated film of a first conductive polymer layer formed through chemical polymerization and a second conductive polymer layer formed through electrolytic polymerization. The material of the conductive polymer layer 3 (first conductive polymer layer and second conductive polymer layer) is not particularly limited. However, it is preferable that the material that is used have superior conductivity, such as polypyrrole, polythiophene, polyaniline, and polyflan.

The cathode layer 4, which is formed by a laminated film of a carbon layer 4a including carbon particles and a silver paste layer 4b including silver particles, is arranged on the conductive polymer layer 3. The cathode layer 4 and the conductive polymer layer 3 form the cathode. In the preferred embodiment, the conductive polymer layer 3, the carbon layer 4a, and the silver paste layer 4b form the cathode. However, the present invention is not limited in such a manner. For example, the cathode may be formed by one or two layers selected from a group including a conductive polymer layer, a carbon layer, and a silver paste layer. Alternatively, the cathode may be formed by other cathode materials. In one example, the cathode is formed by a carbon layer and a silver paste layer and does not use a conductive polymer layer. In this case, the carbon layer enters the pits and the surface of the dielectric layer formed in the porous sintered body. Instead of carbon, other cathode materials can be used. For example, semiconductor particles or metal particles, such as silver or aluminum, may be used. In this manner, a material that results in part of the cathode entering the porous sintered body may be used as the cathode material. For example, instead of a conductive polymer, an oxide, such as manganese dioxide, or a charge transfer complex, such as 7,7,8,8-tetracyanoquinodimethane may be used. Such a material would cover the surface of the dielectric layer in a porous sintered body and the interior of pits.

In the preferred embodiment, a plate-shaped cathode terminal 6 is connected on the cathode layer 4 by way of a conductive adhesive 5, and a plate-shaped anode terminal 7 is connected to the anode lead 1a. Referring to FIG. 1, the anode terminal 7 and the cathode terminal 6 are partially extended out of a mold package 8, which is formed from epoxy resin or the like. The material of the anode terminal 7 and the cathode terminal 6 may be a conductive material such as nickel (Ni). The ends of the anode terminal 7 and the cathode terminal 6 exposed from the mold package B are bent to function as terminals of the solid electrolyte capacitor.

The anode body 1 serves as the "anode" of the present invention. The metal particles of a valve metal serve as the "metal particles" of the present invention. The porous sintered body serves as the "sintered body" of the present invention. The dielectric layer 2 serves as the "dielectric layer" of the present invention. The pits 2a serve as the "recesses" of the present invention. The conductive polymer layer 3 serves as the "conductive polymer layer" of the present invention. The conductive polymer layer 3 and the cathode layer 4 serve as the "cathode" of the present invention.

[Manufacturing Method]

A method for manufacturing the solid electrolyte capacitor shown in FIG. 1 will now be discussed.

Step 1: A green body, which is formed by press forming metal particles that exhibit a valve effect so as to embed part of the anode lead 1a, is sintered in a vacuum environment to form the anode body 1, which is a porous sintered body, around the anode lead 1a. The metal particles are fused to one another.

Step 2: The anode body 1 undergoes anodization in an aqueous solution containing fluoride ions to form the dielectric layer 2 with the oxide of a valve metal that has the predetermined thickness so as to cover the periphery of the anode body 1. In the preferred embodiment, the anodization is performed under a predetermined temperature by varying the applied voltage at a predetermined amplitude and a predetermined cycle to produce a plurality of pits 2a in the surface of the dielectric layer 2 (surface on cathode side). In this case, fluorine enters the dielectric layer 2 and is distributed in a manner concentrated at the anode side of the dielectric layer 2 (interface of dielectric layer 2 and anode body 1).

Step 3: Chemical polymerization is performed to form the first conductive polymer layer on the surface of the dielectric layer 2 and in the pits 2a. Specifically, chemical polymerization forms the first conductive polymer layer by oxidatively polymerizing monomer using an oxidant. Thereafter, electrolytic polymerization is performed to form a second conductive polymer layer on the surface of the first conductive polymer layer. Specifically, during electrolytic polymerization, while using the first conductive polymer layer as an anode, the second conductive polymer layer is formed by performing electro-polymerizing with an external cathode in an electrolytic solution containing monomer and electrolyte. This forms the conductive polymer layer 3 of a laminated film including the first conductive polymer layer and the second conductive polymer layer on the dielectric layer 2 including the interior of the pits 2a.

Step 4: A carbon paste is applied to and dried on the conductive polymer layer 3 to form the carbon layer 4a. A silver paste is applied to and dried on the carbon layer 4a to form the silver paste layer 4b. This forms the cathode layer 4 of the laminated film including the carbon layer 4a and the silver paste layer 4b on the conductive polymer layer 3.

Step 5: After applying a conductive adhesive 5 to the plate-shaped cathode terminal 6, the conductive adhesive 5 is dried between the cathode layer 4 and the cathode terminal 6 so as to connect the cathode layer 4 and the cathode terminal 6 through the conductive adhesive 5. The plate-shaped anode terminal 7 is connected to the anode lead 1a by performing spot welding.

Step 6: A transfer process is performed to mold the mold package 9 from epoxy resin. In this case, the anode lead 1a, the anode body 1, the dielectric layer 2, the conductive polymer layer 3, and the cathode layer 4 are accommodated in the mold package 8, and the ends of the anode terminal 7 and the cathode terminal 6 are extended out of the mold package 8 from opposite directions.

Step 7: The distal ends of the anode terminal 7 and the cathode terminal 6 exposed from the mold package 8 are bent downward and arranged along the lower surface of the mold package 8. The distal ends of the terminals function as terminals of the solid electrolyte capacitor and are used to electrically connect the solid electrolyte capacitor to a substrate.

Through the above steps, the solid electrolyte capacitor of the preferred embodiment is manufactured.

EXAMPLES

In the following examples and comparative examples, the method for manufacturing the solid electrolyte capacitor was performed until the cathode layer was formed. Then, a performance evaluation was performed.

Example 1

In example 1, a solid electrolyte capacitor A1 was fabricated through steps 1A to 4A, which correspond to steps 1 to 4 in the preferred embodiment of a manufacturing method.

Step 1A: Niobium metal powder having a CV value of 150,000 μF·V/g was prepared. The CV value is the product of the capacitance of the niobium porous sintered body and the electrolysis voltage after the formation of the electrolytic oxidation coating (dielectric layer). The mold package was molded from the niobium metal powder to embed part of the anode lead 1a and then sintered in a vacuum environment at a temperature of approximately 1,200° C. This formed an anode body 1 of niobium porous sintered body. The niobium metal particles were fused to one another. Unless otherwise mentioned, the CV value in each of the following examples and comparative examples is 150,000 μF·V/g.

Step 2A: Anodization was performed on the anode body 1 for ten hours with a center voltage of 20 V (amplitude of 0.20 V, cycle of 10 minutes) in an ammonium fluoride aqueous solution of 0.1% by weight held at a temperature maintained at 52° C. This formed the dielectric layer 2 having a thickness of about 80 nm from niobium oxide containing fluorine so as to cover the periphery of the anode body 1, and a plurality of bore-shaped pits 2a were formed in the surface of the dielectric layer 2 (surface on cathode side). In this case, the concentration of fluorine in the thicknesswise direction of the dielectric layer 2 is maximum at the interface of the dielectric layer 2 and the anode body 1. The ammonium fluoride aqueous solution was voltage-controlled to finish the bore-shaped pits 2a with the average of the opening diameter W being 2.5 nm, the average of the depth D being 6.2 nm (2.5 times greater than the average diameter), the average of the interval L between adjacent pits being 7.5 nm (3 times greater than the average diameter), and the average of the area rate P of the pit opening being 1/16.

With respect to the opening diameter W in the present invention, about one hundred pits were randomly extracted from a cross-sectional transmission electron microscope (TEM) image of the vicinity of the anode body. Then, the maximum diameter in the cross-section of each pit was used as the opening diameter, and the average of such opening diameters was obtained as the average opening diameter. In the same manner, with respect to the depth D, about one hundred pits were randomly extracted, and the average of the depths was obtained as the average depth. With respect to the interval L between adjacent pits, the interval between the ends of adjacent pits was checked at about one hundred randomly extracted locations, and the average of the intervals was obtained as the average interval.

Furthermore, a predetermined region including a plurality of pits, in this case, about ten (eight to twelve) pits was set as the region for obtaining the area rate P of the pit openings in the present invention. Specifically, in an observation picture obtained by a three-dimensional TEM and the like, a predetermined region including about ten (eight to twelve) pits was set, and a ratio of the total Y of the area yi occupied by the openings of the plurality of pits in the set region with respect to the area X of the predetermined region was obtained as the area rate P. With respect to the area rate P, the equation shown below indicates the relationship of the area X of the predetermined region and the total Y of the area yi of the pit openings.

$$P = \frac{Y}{X} = \frac{\sum_{i=1}^{n} y_i}{X}$$

Step 3A: The anode body 1 on which is formed the dielectric layer 2 with a surface including the pits 2a was immersed in an oxidant solution and then immersed in a pyrrole monomer solution to polymerize the pyrrole monomer on the dielectric layer 2. This formed the first conductive polymer of polypyrrole on the dielectric layer 2. Subsequently, while using the first conductive polymer layer as an anode, the second conductive polymer layer was further formed with a predetermined thickness on the first conductive polymer layer by performing electrolytic polymerization in the electrolytic solution containing the pyrrole monomer and the electrolyte. This formed the second conductive polymer layer on the first conductive polymer layer. The conductive polymer layer 3 including a laminated film of the first conductive polymer layer and the second conductive polymer layer formed on the surface of the dielectric layer 2 and in the pits 2a.

Step 4A: Carbon paste was applied to and dried on the conductive polymer layer 3 to form the carbon layer 4a, which is a layer of carbon particles, and silver paste was applied to and dried on the carbon layer 4a to form the silver paste layer 4b, which is a layer of silver particles. This formed the cathode layer 4 of a laminated film including the carbon layer 4a and the silver paste layer 4b on the conductive polymer layer 3.

The solid electrolyte capacitor A1 of example 1 was fabricated in this manner.

Example 2

In example 2, a solid electrolyte capacitor A2 was fabricated in a manner similar to example 1. However, the voltage control conditions during the anodization performed to form the dielectric layer including pits in step 2A were changed from the cycle of ten minutes (center voltage of 20 V, amplitude of 0.20 V) to the cycle of five minutes (center voltage of 20 V, amplitude of 0.20 V). The pits 2a formed under such conditions had an average diameter of 0.2 nm, an average depth of 0.5 nm (2.5 times greater than the average diameter), an average interval of 0.6 nm (3 times greater than the average diameter), and a pit opening area rate of 1/16.

Examples 3 to 9

In examples 3 to 9, solid electrolyte capacitors A3 to A9 were fabricated in a manner similar to example 1. However, the voltage control conditions during the anodization performed to form the dielectric layer including pits in step 2A were changed from the cycle of ten minutes (center voltage of 20 V, amplitude of 0.20 V) to the cycle of two minutes, seven minutes, thirteen minutes, fifteen minutes, seventeen minutes, twenty minutes, and sixty minutes (center voltage of 20 V, amplitude of 0.20 V). The pits formed under such conditions had an average diameter of 0.1 nm to 70.0 nm (refer to FIG. 6), an average depth of 0.2 nm to 175.0 nm (2.5 times greater than the average diameter), an average interval of 0.3 nm to 210.0 nm (3 times greater than the average diameter), and a pit opening area rate of 1/16.

Example 10

In example 10, a solid electrolyte capacitor B1 was fabricated in a manner similar to example 1. However, the set temperature during the anodization performed to form the dielectric layer including pits in step 2A was changed from the temperature of 52° C. to the temperature of 60° C. The pits formed under such conditions had an average diameter of 2.5 nm, an average depth of 15.0 nm (6 times greater than the average diameter), an average interval of 7.5 nm (3 times greater than the average diameter), and a pit opening area rate of 1/16.

Examples 11 to 19

In examples 11 to 19, solid electrolyte capacitors B2 to B10 were fabricated in a manner similar to example 1. However, the set temperature during the anodization performed to form the dielectric layer including pits in step 2A was changed from the temperature of 52° C. to the temperatures of 40° C., 45° C., 50° C., 55° C., 63° C., 64° C., 65° C., 70° C., and 80° C. The pits formed under such conditions had an average diameter of 2.5 nm, an average depth of 2.5 nm to 75.0 nm (refer to FIG. 7), an average interval of 7.5 nm (3 times greater than the average diameter), and a pit opening area rate of 1/16.

Example 20

In example 20, a solid electrolyte capacitor C1 was fabricated in a manner similar to example 1. However, the voltage control conditions during the anodization performed to form the dielectric layer including pits in step 2A were changed from the amplitude of 0.20 V (center voltage of 20 V, cycle of ten minutes) to the amplitude of 0.50 V (center voltage of 20 V, cycle of ten minutes). The pits formed under such conditions had an average diameter of 2.5 nm, an average depth of 15.0 nm (6 times greater than the average diameter), an average interval of 5.0 nm (2 times greater than the average diameter), and a pit opening area rate of 1/9.

Examples 21 to 28

In examples 21 to 28, solid electrolyte capacitors C2 to C9 were fabricated in a manner similar to example 1. However, the voltage control conditions during the anodization performed to form the dielectric layer including pits in step 2A were changed from the amplitude of 0.20 V (center voltage of 20 V, cycle of ten minutes) to the amplitudes of 1.00 V, 0.70 V, 0.17 V, 0.15 V, 0.13 V, 0.10 V, 0.05 V, 0.03 V (center voltage of 20 V, cycle of ten minutes). The pits formed under such conditions had an average diameter of 2.5 nm, an average depth of 15.0 nm (6 times greater than the average diameter), an average interval of 3.8 nm to 250.0 nm (refer to FIG. 8), and a pit opening area rate of 1/10000 to 1/6.2 (refer to FIG. 8).

Examples 29 to 32

In examples 29 and 30, solid electrolyte capacitors D1 and D2 were fabricated in a manner similar to example 1. However, the voltage control conditions during the anodization performed to form the dielectric layer including pits in step 2A were changed from the amplitude of 0.20 V and the cycle of ten minutes (center voltage of 20 V) to the amplitude of 0.1 V to 0.5 V and the cycle of five minutes (center voltage 20 V).

In examples 31 and 32, solid electrolyte capacitors D3 and D4 were fabricated in a manner similar to example 1. However, the voltage control conditions during the anodization performed to form the dielectric layer including pits in step 2A were changed from the amplitude of 0.20 V and the cycle of ten minutes (center voltage 20 V) to the amplitude of 0.1 V to 0.5 V and a cycle of twenty minutes (center voltage 20 V).

Figure 9:
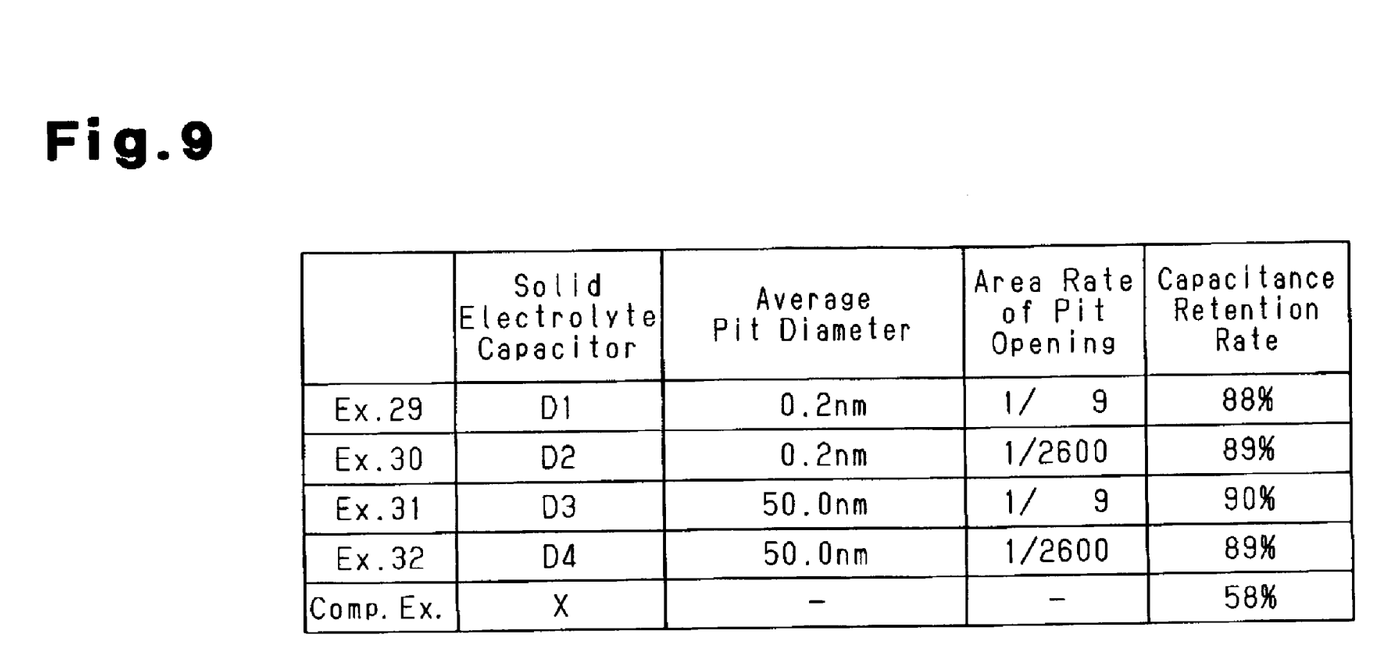
FIG. 9 is a chart showing the evaluation results of a capacitance retention rate that is dependent on the area rate of pits.

The pits formed in the dielectric layers of the solid electrolyte capacitors D1 to D4 in examples 29 to 32 under such conditions had an average diameter of 0.2 nm to 50 nm, an average depth of 15.0 nm, and a pit opening area rate of 1/2600 to 1/9 (refer to FIG. 9).

Example 33

In example 33, a solid electrolyte capacitor E was fabricated in a manner similar to example 1. However, the voltage control conditions during the anodization performed to form the dielectric layer including pits in step 2A were changed from the temperature of 52° C., the amplitude of 0.20 V, and the cycle of ten minutes (center voltage 20 V) to the temperature of 54° C., the amplitude of 1.2 V, and the cycle of fourteen minutes (center voltage 20 V). The pits formed in the dielectric layer of the solid electrolyte capacitor E in example 33 under such conditions had an average diameter of 7 nm, an average depth of 25.0 nm, an average interval of 5.0 nm, and a pit opening area rate of 1/1.4.

Comparative Example

In a comparative example, a solid electrolyte capacitor X was fabricated in a manner similar to example 1. However, the voltage control conditions during the anodization performed in step 2A were the same as the prior art in which a constant voltage (voltage 20 V) was used. Under such conditions, the dielectric layer was formed without any pits in its surface.

[Evaluation]

Figure 3A:
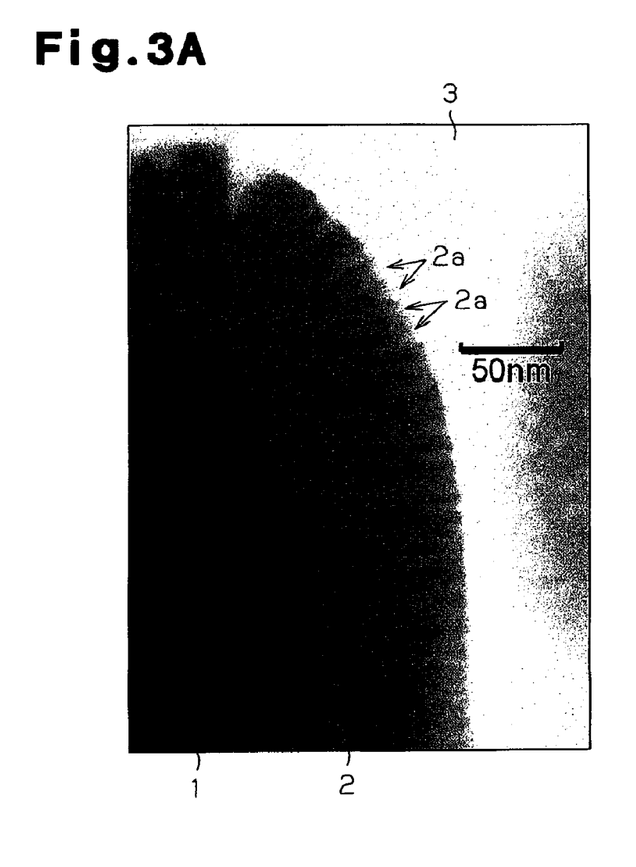
FIG. 3A is a cross-sectional TEM image showing the vicinity of the anode body in a solid electrolyte capacitor of example 33.
Figure 3B:
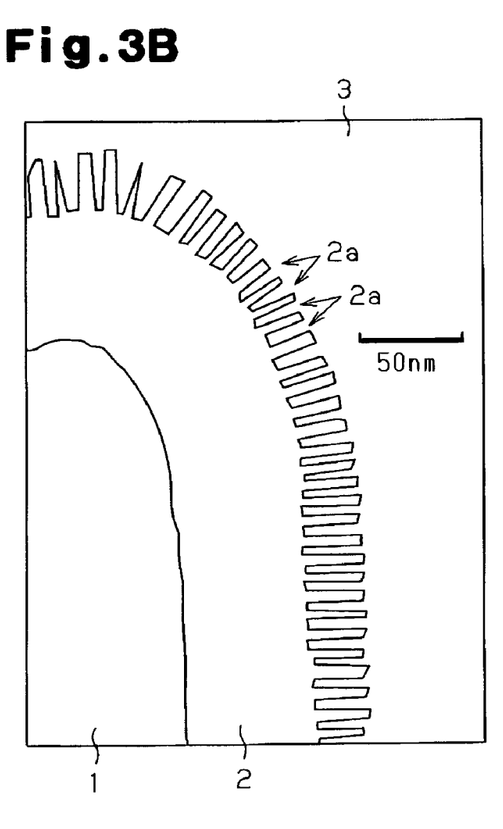
FIG. 3B is a schematic diagram showing the vicinity of the anode body in correspondence with the cross-sectional TEM image of FIG. 3A.

First, the cross-section of the solid electrolyte capacitor E in example 33 near the anode body a1 was observed. FIG. 3A is a cross-sectional TEM image of the porous sintered body that forms the anode body, and FIG. 3B is a schematic diagram showing the vicinity of the anode body in correspondence with the cross-sectional TEM image. As apparent from FIGS. 3A and 3B, the plurality of pits 2a (recesses) are formed in the dielectric layer 2 along the surface of the dielectric layer 2 (cathode side surface). It is also apparent that the pits 2a are formed as if they are bored orthogonally (in the normal direction) from the surface of the dielectric layer 2 towards the anode body 1, that is, in the thicknesswise direction of the dielectric layer 2. The pits 2a of the dielectric layer 2 are finished in a state in which they are hollow and are not filled with the conductive polymer layer 3 and are hollow, a state in which they are filled with the conductive polymer layer 3, or a state in which the both of the preceding states coexist. FIG. 3B shows a state in which the pits 2a are filled with the conductive polymer layer 3.

Figure 5:
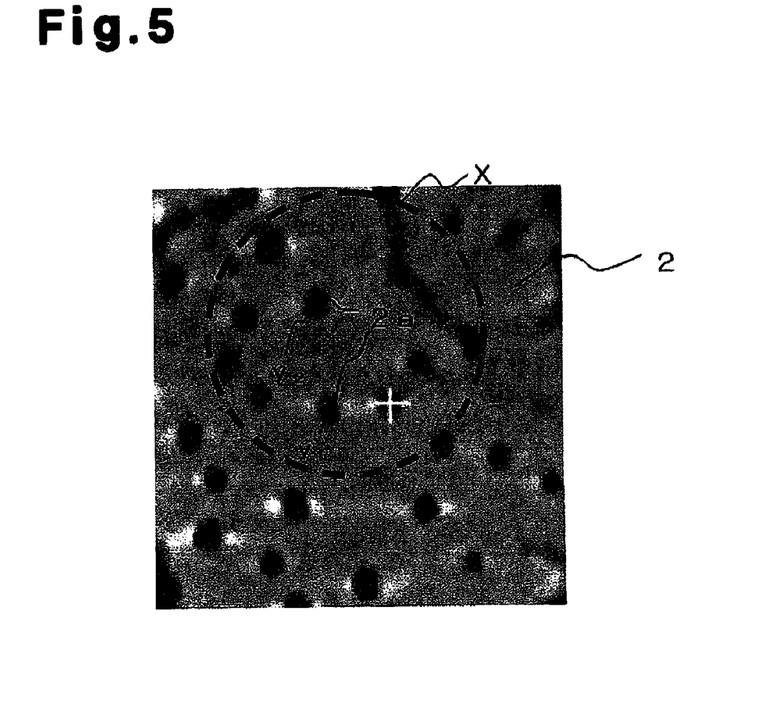
FIG. 5 is a three-dimensional TEM image showing the surface of the anode body in the solid electrolyte capacitor to illustrate a process for measuring an area rate P.

FIG. 5 is a TEM image taken by a three-dimensional TEM and shows the surface of the dielectric layer 2 when observed from the side of the conductive polymer layer 3. A process for measuring the area rate P of the pit opening described above will now be discussed in detail with reference to FIG. 5. In the drawing, the white portions are the surface of the dielectric layer 2, and the black dot-like portions are the openings of the pits 2a. The area yi of the pit openings can be obtained from the black dot-like portions. Further, a circular region X is set in the observation field of the TEM image as shown in FIG. 5 as the predetermined region that includes ten pits. In this case, the area X of the predetermined region is 12,900 nm$^2$, and the total Y of the area y of each pit opening is 285 nm$^2$. Thus, the area rate P is 1/33.5.

Figure 6:
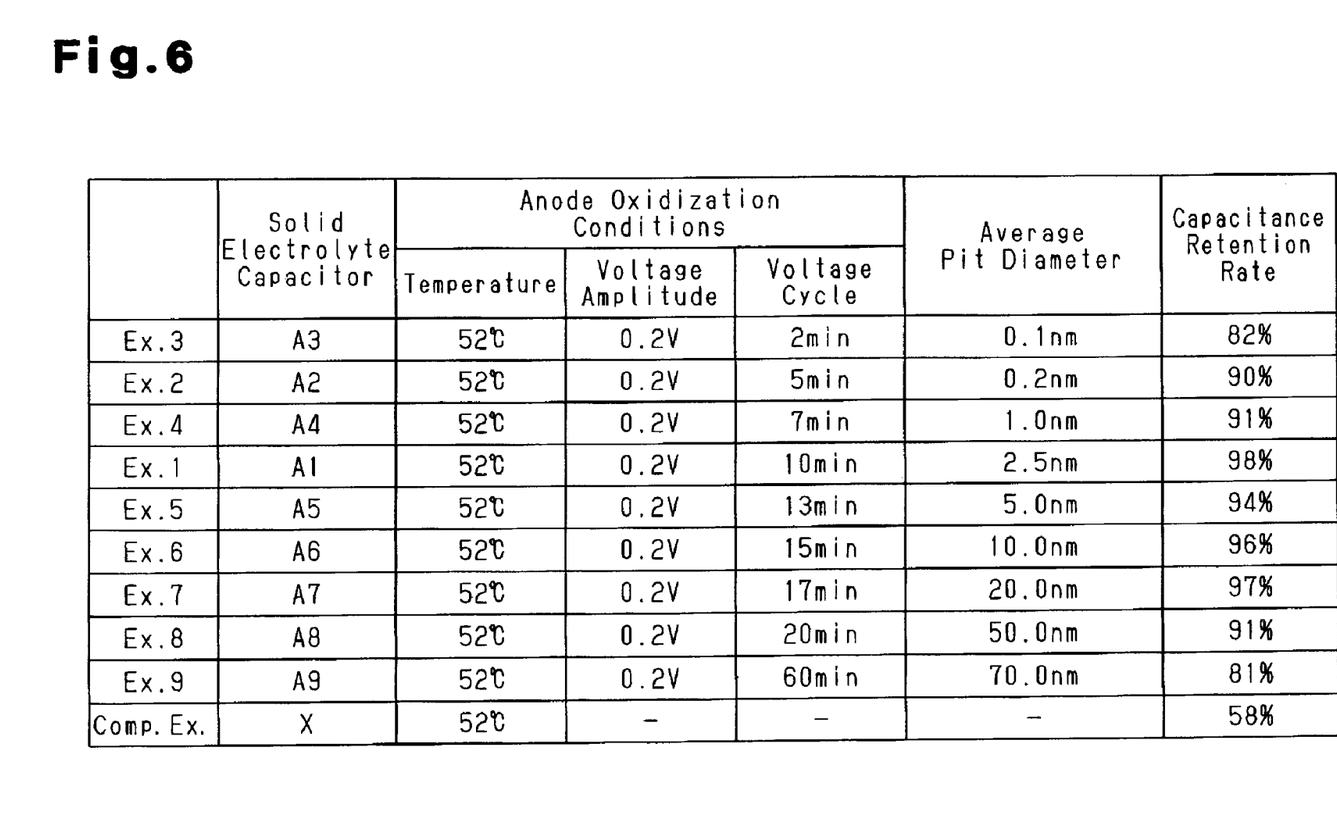
FIG. 6 is a chart showing the evaluation results of a capacitance retention rate that is dependent on the average diameter of pits.
Figure 7:
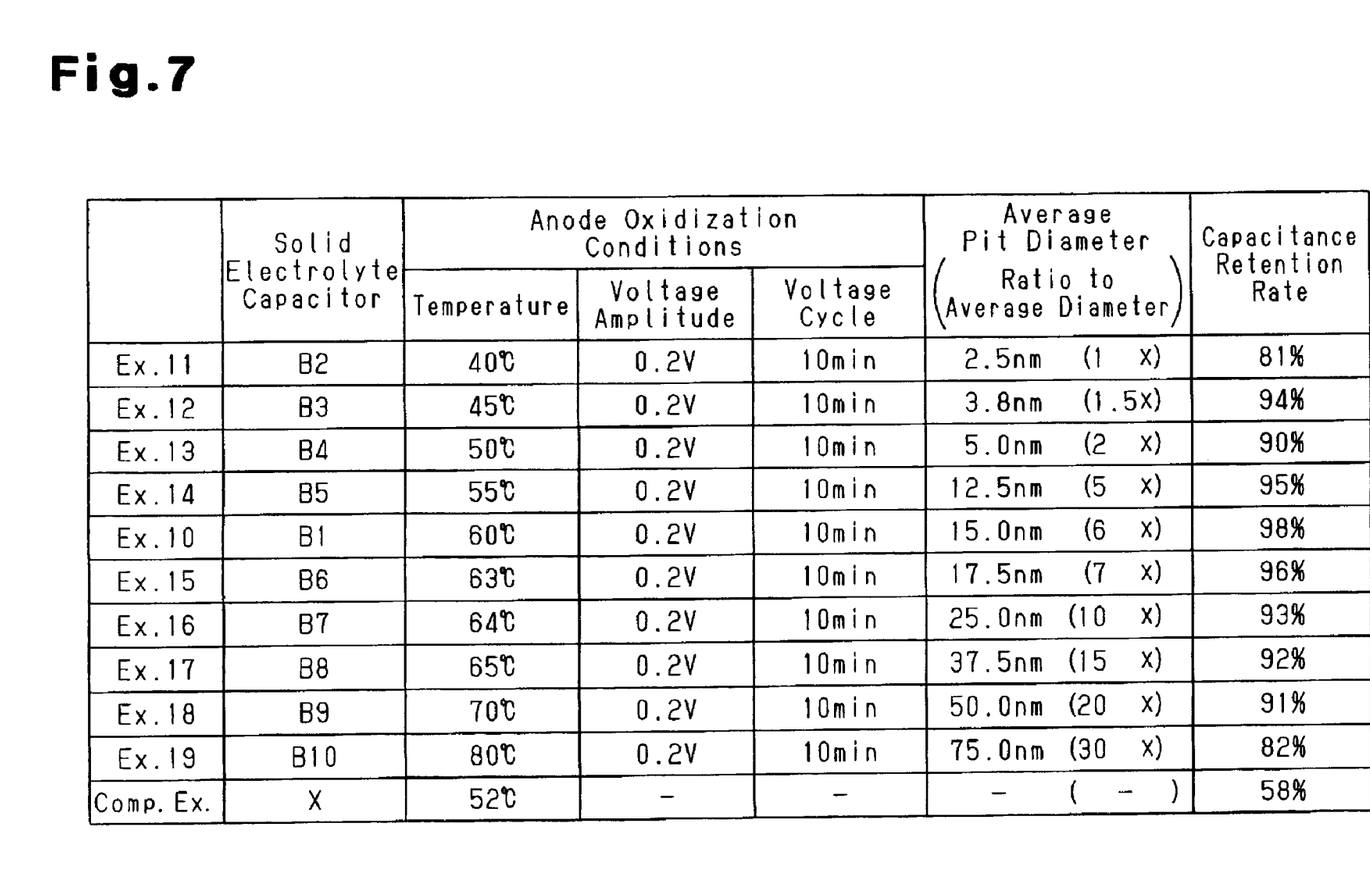
FIG. 7 is a chart showing the evaluation results of a capacitance retention rate that is dependent on the average depth of pits.
Figure 8:
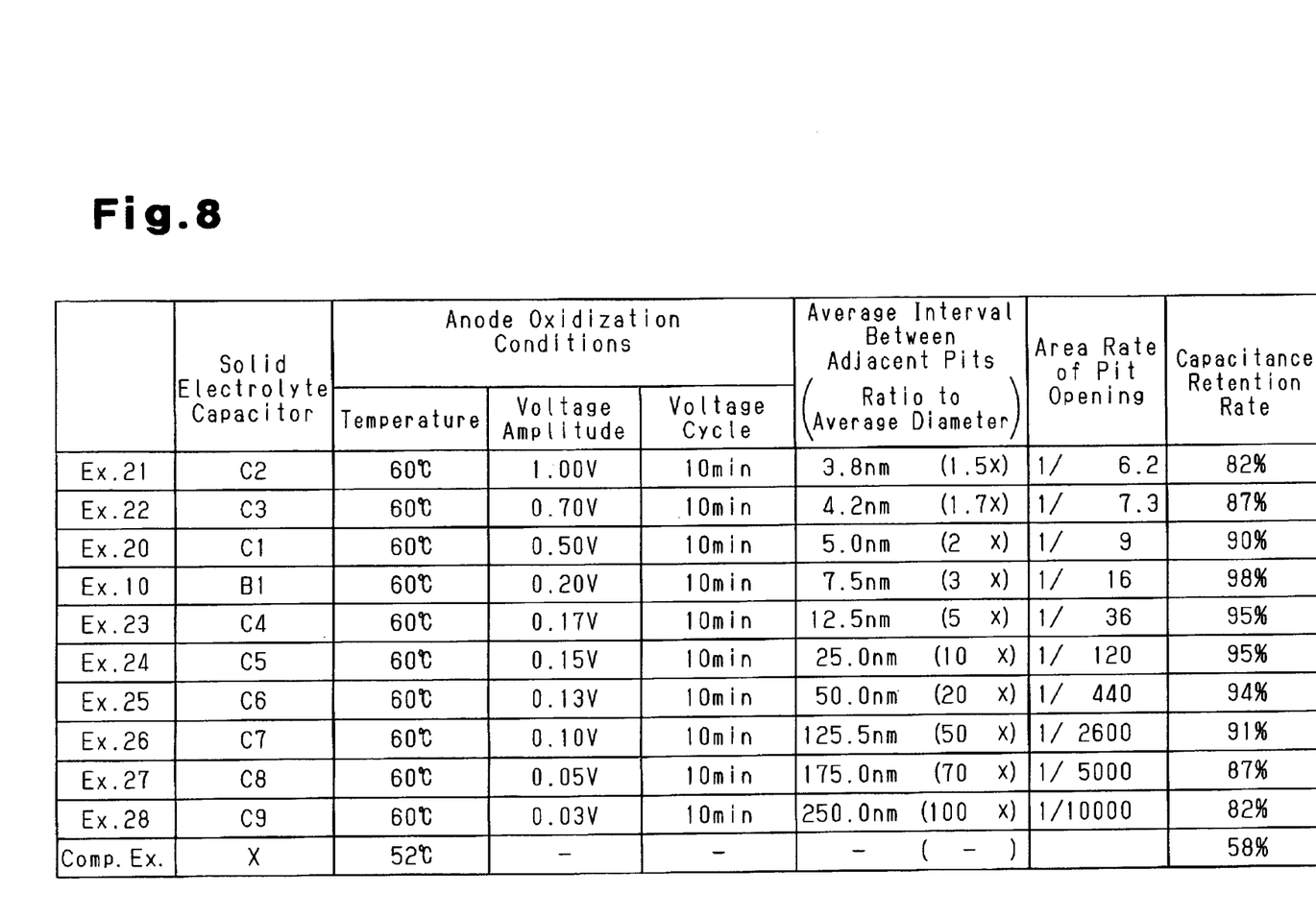
FIG. 8 is a chart showing the evaluation results of a capacitance retention rate that is dependent on the average interval between adjacent pits and the area rate of pits.

Then, the capacitance retention rate of each solid electrolyte capacitor was evaluated. FIGS. 6 to 9 show the evaluation results of the capacitance retention rate for each solid electrolyte capacitor. FIG. 6 is a chart showing the evaluation results based on the average diameter of the pits, FIG. 7 is a chart showing the evaluation results based on the average depth of the pits, FIG. 8 is a chart showing the evaluation results based on the average interval between adjacent pits and the pit opening area rate, and FIG. 9 is a chart showing the evaluation results based on the pit opening area rate. In the charts, the value of each capacitance retention rate is the average for ten samples.

The capacitance retention rate is calculated from the following equation (1) using the capacitance before a high temperature static test and the capacitance after the high temperature static test. The deterioration in capacitance is smaller as the capacitance retention rate becomes closer to 100.

capacitance retention rate (%)=(capacitance after high temperature static test/capacitance before high temperature static test)×100 (1)

The conditions under which the capacitance was measured were as described below.

For each solid electrolyte capacitor, the capacitance (capacitance of the solid electrolyte capacitor at frequency 120 Hz) was measured using an LCR meter before the high temperature static test and after 2000 hours elapsed in a state in which the solid electrolyte capacitor was held in a constant-temperature bath maintained at 105° C. to conduct the high temperature static test.

As shown in FIG. 6, the decrease in the capacitance retention rate was reduced and the deterioration of the capacitance was suppressed by the pits of the dielectric layer in examples 1 to 9 (solid electrolyte capacitors A1 to A9) that included pits of the average diameter in the surface of the dielectric layer as compared with the comparative example (solid electrolyte capacitor X) of the prior art. In other words, at portions of the dielectric layer where the conductive polymer layer is not filled in a pit but becomes hollow due to a pit, the stress generated from the difference in the thermal expansion coefficient between the dielectric layer and the conductive polymer layer during the application of a heat load is moderated by the deformation (expansion and contraction) of such hollows. As a result, compared to when the pits are not formed in the dielectric layer or when hollows formed by pits do not exist, the separation of the dielectric layer and the conductive polymer layer from each other is suppressed (stress moderating effect resulting from hollows). At portions of the conductive polymer layer filled in the pits of the dielectric layer, the adherence strength between the dielectric layer and the conductive polymer layer is increased by the anchor effect and the increase in the area of contact between the dielectric layer and the conductive polymer layer. As a result, in comparison to when the pits are not formed in the dielectric layer or when the conductive polymer layer is not filled in the pits of the dielectric layer, separation of the dielectric layer and the conductive polymer layer from each other is suppressed (adherence enhancing effect resulting from the pit filling).

In the above examples, when the average diameter of the pits is 0.2 nm to 50.0 nm, the decrease in the capacitance retention rate was small. The effect for preventing the capacitance retention rate from decreasing was relatively small when the average diameter of the pit was 0.1 nm. It is understood that this is because the stress moderating effect and the adherence enhancing effect become insufficient when the pits of the dielectric layer are small. It is also understood that when the average diameter of the pit is 70.0 nm, separation of the conductive polymer layer filled in the pits easily occurs.

As shown in FIG. 7, it is apparent that the decrease in the capacitance retention rate becomes small and that deterioration of the capacitance is further suppressed by the pits of the dielectric layers in examples 10 to 19 (solid electrolyte capacitors B1 to B10) in which the pits formed in the surface of the dielectric layer have various average depths as compared with the comparative example (solid electrolyte capacitor X) of the prior art. Decrease in the capacitance retention rate is further reduced when the average depth of the pits is 3.8 nm to 50.0 nm (1.5 times to 20 times greater than the average diameter) in these examples. It is understood that the effect for preventing the capacitance retention rate from decreasing becomes insufficient when the average depth of the pits is 2.5 nm (equal to the average diameter) because the stress moderating effect and the adherence enhancing effect are insufficient when the pits of the dielectric layer are shallow. It is also understood that when the average depth of the pits is 75.0 nm (30 times greater than the average diameter), the amount of contraction increases at the distal portions (bottom side of the pits) of the conductive polymer layer during contraction of the conductive polymer layer in the pits, and separation of the conductive polymer layer at the bottom of the pits easily occurs.

As shown in FIG. 8, decrease in the capacitance retention rate becomes small and deterioration of the capacitance is suppressed by the pits of the dielectric layers in examples 10 and 20 to 28 (solid electrolyte capacitors B1 and C1 to C9) in which the pits formed in the surface of the dielectric layer are distributed at the average intervals as compared with the comparative example (solid electrolyte capacitor X) of the prior art. Decrease in the capacitance retention rate is further reduced when the pits are distributed so that the average interval between adjacent pits is 2 to 50 times greater than the average diameter in these examples. It is understood that the effect for preventing the capacitance retention rate from decreasing becomes insufficient when the average interval between the pits is 1.5 times greater than the average diameter. This is because cracks are apt to forming in the dielectric layer (in particular, the dielectric layer at the bottom of pits) when the pits are distributed in a highly concentrated manner and thereby lower the capacitance. It is also understood that when the average interval between the pits is greater than or equal to 70 times greater than the average diameter, the distributed amount of the pits is small, and the stress moderating effect and the adherence enhancing effect become insufficient.

Decrease in the capacitance retention rate become further smaller when the pit opening area rate is 1/2600 to 1/9 in examples 10 and 20 to 28 (solid electrolyte capacitors B1 and C1 to C9). It is understood that the effect for preventing the capacitance retention rate from decreasing is insufficient in example 21 in which the pit opening area rate is 1/6.2 as compared to examples 10, 20, and 22 to 26. This is because cracks are apt to form in the dielectric layer (in particular, the dielectric layer at the bottom of the pits) due to the pits being distributed in a highly concentrated manner and thereby lower the capacitance. It is also understood that the effect for preventing the capacitance retention rate from decreasing is insufficient in example 27 in which the pit opening area rate is 1/5000 as compared with examples 10, 20, and 23 to 26 because the distributed amount of the pits is small, and the stress moderating effect and the adherence enhancing effect become insufficient.

As shown in FIG. 9, decrease in the capacitance retention rate is reduced by about 30% and deterioration of the capacitance is suppressed by the pits of the dielectric layer in examples 29 to 32 (solid electrolyte capacitors D1 to D4) in which the pits are distributed in the surface of the dielectric layer at the average intervals as compared with comparative example (solid electrolyte capacitor X) of the prior art. The capacitance retention rate of example 29 is about the same (difference of only 1%) as example 2, in which the average diameter is the same as example 29, and example 20, in which the area rate is the same as example 29. The capacitance retention rate of example 30 is about the same as example 2, in which the average diameter is the same as example 30, and example 26, in which the area rate is the same as example 30. The capacitance retention rate of example 31 is about the same as example 8, in which the average diameter is the same as example 31, and example 20, in which the area rate is the same as example 31. The capacitance retention rate of example 32 is about the same as example 8, in which the average diameter is the same as example 32, and example 26, in which the area rate is the same as example 32.

The solid electrolyte capacitor of the preferred embodiment has the advantages described below.

(1) The plurality of pits 2a arranged in the surface (cathode side surface) of the dielectric layer 2 prevents the application of heat load from separating the dielectric layer 2 and the conductive polymer layer 3. As a result, deterioration of the capacitance does not occur in the solid electrolyte capacitor.

(2) The plurality of pits 2a of the dielectric layer 2 include pits that are hollow, pits filled with the conductive polymer layer 3, or both hollow and filled pits. This suppresses separation of the dielectric layer 2 and the conductive polymer layer 3 as compared with the prior art in which the pits 2a are not formed in the dielectric layer 2. As a result, deterioration of the capacitance does not occur in the solid electrolyte capacitor.

(3) The dielectric layer 2 is formed with a predetermined thickness on the surface of each metal particle of the anode body 1, and the pits 2a are formed in the thicknesswise direction of the dielectric layer 2. Thus, the pits 2a are arranged in a highly concentrated manner in the surface of the dielectric layer 2, and the stress moderating effect and the adherence enhancing effect of the pits 2a is further improved. Thus, advantages (1) and (2) become further outstanding.

(4) The dielectric layer 2 contains fluorine, which is concentrated at the anode side surface (interface of dielectric layer 2 and anode body 1) to suppress the diffusion of oxygen from the dielectric layer 2 to the anode body 1 so that oxygen remains at the cathode side surface of the dielectric layer 2 (interface of dielectric layer 2 and conductive polymer layer 3) in a stable state. Thus, the state of the cathode side surface of the dielectric layer 2 is stabilized with respect to heat load, and the separation of the dielectric layer 2 and the conductive polymer layer 3 from each other is suppressed. As a result, deterioration of the capacitance does not occur in the solid electrolyte capacitor. When using fluorine in the dielectric layer 2 to reduce leakage current, the pits 2a in the dielectric layer 2 efficiently supply fluorine to the vicinity of the anode body of side of the dielectric layer 2 through the opening of the pits 2a in the anodization step.

(5) The opening diameter of the pits 2a formed in the surface of the dielectric layer 2 have an average diameter of 0.2 nm to 50.0 nm. Thus, advantages (1) to (3) become further outstanding.

(6) The depth of the pits 2a formed in the surface of the dielectric layer 2 is 1.5 times to 20 times greater than the average diameter. Thus, at least advantages (1) to (3) become further outstanding.

(7) The pits 2a formed in the surface of the dielectric layer 2 are distributed so that the average interval between adjacent pits is in the range of 2 times to 50 times greater than the average diameter. Thus, at least advantages (1) to (3) become further outstanding.

(8) The pits 2a formed in the surface of the dielectric layer 2 are distributed so that the rate of total area of the pit openings relative to the area in which a predetermined number of pits 2a are included is 1/2600 to 1/9 of the average diameter. Thus, at least advantages (1) to (3) become further outstanding.

(9) The preferred embodiment of a method for manufacturing a solid electrolyte capacitor includes the step of forming the dielectric layer 2 by anodizing the surface of the anode 1 and the step of forming the conductive polymer layer 3 on the dielectric layer 2. The step of forming the dielectric layer 2 includes forming a plurality of pits 2a in the surface of the dielectric layer 2 by varying the application voltage during the anodization at a predetermined amplitude and at a predetermined cycle. Furthermore, the anodization is conducted in the electrolytic solution containing fluoride ions.

This method obtains the optimal solid electrolyte capacitor as described in advantages (1) to (8).

(10) In the preferred embodiment of a method for manufacturing a solid electrolyte capacitor, the plurality of pits 2a is formed in the surface of the dielectric layer 2 by just changing the voltage control conditions during anodization. This manufactures a solid electrolyte capacitor having a capacitance that does not decrease.

It should be apparent to those skilled in the art that the present invention may be embodied in many other specific forms without departing from the spirit or scope of the invention. Particularly, it should be understood that the present invention may be embodied in the following forms.

In the above examples, niobium metal is used. However, the present invention is not limited in such a manner. For example, a valve metal such as tantalum, aluminum, and titanium, or an alloy of these metals may be used to form the plurality of pits in surface of the dielectric layer.

In the above examples, anodization is performed using ammonium fluoride aqueous solution as the electrolytic solution that containing fluoride ions. However, the present invention is not limited in such a manner. For example, the electrolytic solution may be a potassium fluoride aqueous solution, a sodium fluoride aqueous solution, or a hydrofluoric acid aqueous solution. Further, such electrolytic solutions may be mixed.

The present examples and embodiments are to be considered as illustrative and not restrictive, and the invention is not to be limited to the details given herein, but may be modified within the scope and equivalence of the appended claims.

What is claimed is:

1. A solid electrolyte capacitor comprising:
an anode;
a cathode; and
a dielectric layer arranged between the anode and the cathode in contact with the cathode;
wherein the dielectric layer includes a plurality of recesses arranged at an interface between the dielectric layer and the cathode; and
wherein when the area of a predetermined region in the dielectric layer that includes a predetermined number of the plurality of recesses is represented by X and the total area of the opening of each recess in the predetermined region is represented by Y, the plurality of recesses are distributed so that an area rate P expressed as P=Y/X is 1/2600 to 1/9.

2. The solid electrolyte capacitor according to claim 1, wherein:
the anode is formed by a sinter including a plurality of metal particles;
the dielectric layer is formed on the surface of each of the plurality of metal particles with a predetermined thickness; and
the plurality of recesses extend in a thicknesswise direction of the dielectric layer.

3. The solid electrolyte capacitor according to claim 1, wherein the plurality of recesses each include an opening having an average diameter of 0.2 nm to 50.0 nm.

4. The solid electrolyte capacitor according to claim 1, wherein the plurality of recesses each include an opening having a predetermined average diameter and a depth of 1.5 times to 20 times greater than the average diameter.

5. The solid electrolyte capacitor according to claim 1, wherein the plurality of recesses each include an opening having a predetermined average diameter, in which adjacent ones of the recesses are spaced apart at an interval of 2 times to 50 times greater than the average diameter.

6. The solid electrolyte capacitor according to claim 1, wherein the cathode includes a conducive polymer layer arranged in contact with the dielectric layer.

* * * * *